(12) United States Patent
Long et al.

(10) Patent No.: US 11,463,780 B1
(45) Date of Patent: Oct. 4, 2022

(54) LOCALLY RELAYED BROADCAST AND COMMUNITY SERVICE TELEVISION

(71) Applicant: Didja, Inc., Los Altos, CA (US)

(72) Inventors: James E. Long, Menlo Park, CA (US); James A. Erickson, Newman, CA (US); Ali Mehrpour, San Jose, CA (US); Donald E. Meyer, San Jose, CA (US); James E. Monroe, San Carlos, CA (US); Jay B. Perry, Los Altos, CA (US); Claire E. Schendel, Petaluma, CA (US); Delmer R. Schneider, Jr., Manteca, CA (US); Andrii Skaliuk, San Bruno, CA (US); Michael J. Sobieski, Petaluma, CA (US); Eric L. Walstad, San Francisco, CA (US)

(73) Assignee: Didja, Inc., Los Altos, CA (US)

( * ) Notice: Subject to any disclaimer, the term of this patent is extended or adjusted under 35 U.S.C. 154(b) by 12 days.

(21) Appl. No.: 17/032,698

(22) Filed: Sep. 25, 2020

Related U.S. Application Data

(62) Division of application No. 15/829,804, filed on Dec. 1, 2017, now Pat. No. 10,805,688.

(60) Provisional application No. 62/429,673, filed on Dec. 2, 2016.

(51) Int. Cl.
| | | |
|---|---|---|
| *H04N 7/173* | (2011.01) | |
| *H04N 21/61* | (2011.01) | |
| *H04N 21/854* | (2011.01) | |
| *H04N 21/488* | (2011.01) | |
| *H04N 21/2343* | (2011.01) | |
| *H04N 21/858* | (2011.01) | |
| *H04N 21/438* | (2011.01) | |
| *H04N 21/482* | (2011.01) | |
| *H04N 21/262* | (2011.01) | |
| *H04N 21/643* | (2011.01) | |

(Continued)

(52) U.S. Cl.
CPC ..... *H04N 21/6143* (2013.01); *H04N 21/2187* (2013.01); *H04N 21/234309* (2013.01); *H04N 21/26283* (2013.01); *H04N 21/4383* (2013.01); *H04N 21/4821* (2013.01); *H04N 21/4882* (2013.01); *H04N 21/6193* (2013.01); *H04N 21/643* (2013.01); *H04N 21/854* (2013.01); *H04N 21/8586* (2013.01); *H04N 21/4147* (2013.01); *H04N 21/6125* (2013.01); *H04N 21/6175* (2013.01)

(58) Field of Classification Search
CPC ........... H04N 21/6143; H04N 21/2187; H04N 21/234309; H04N 21/26283; H04N 21/4383; H04N 21/4821; H04N 21/4882; H04N 21/6193; H04N 21/643; H04N 21/854; H04N 21/8586; H04N 21/4147; H04N 21/6125; H04N 21/6175
See application file for complete search history.

(56) References Cited

U.S. PATENT DOCUMENTS

| | | | |
|---|---|---|---|
| 6,182,287 B1 * | 1/2001 | Schneidewend | ............................. H04N 21/43615 715/717 |
| 6,732,372 B2 | 5/2004 | Tomita | |
| 6,816,172 B1 | 11/2004 | Iki | |

(Continued)

*Primary Examiner* — Michael B. Pierorazio
(74) *Attorney, Agent, or Firm* — Fish & Richardson P.C.

(57) ABSTRACT

Methods, systems, and apparatus, including computer programs encoded on computer storage media, for streaming live television broadcasts and providing DVR services to subscribers in a designated market area.

52 Claims, 11 Drawing Sheets

(51) Int. Cl.
*H04N 21/2187* (2011.01)
*H04N 21/4147* (2011.01)

(56) References Cited

U.S. PATENT DOCUMENTS

| | | | |
|---|---|---|---|
| 6,943,845 B2 * | 9/2005 | Mizutome | H04N 21/434 |
| | | | 348/553 |
| 7,117,515 B2 | 10/2006 | Kim | |
| 7,818,767 B2 | 10/2010 | Domegan | |
| 7,908,626 B2 | 3/2011 | Williamson | |
| 8,375,410 B2 | 2/2013 | Lee | |
| 8,392,954 B2 | 3/2013 | Kliegman | |
| 8,555,307 B2 | 10/2013 | Kim | |
| 8,560,967 B2 * | 10/2013 | Heo | H04M 1/72445 |
| | | | 715/802 |
| 8,565,578 B2 | 10/2013 | Plurde, Jr. | |
| 9,024,894 B1 * | 5/2015 | Smith | G06F 3/0488 |
| | | | 345/173 |
| 9,832,502 B1 * | 11/2017 | Goetz | H04N 21/4524 |
| 10,805,688 B1 | 10/2020 | Long et al. | |
| 2005/0235319 A1 * | 10/2005 | Carpenter | H04N 21/4438 |
| | | | 348/E5.103 |
| 2008/0276280 A1 * | 11/2008 | Nashida | H04N 21/4532 |
| | | | 348/E5.112 |
| 2011/0246622 A1 | 10/2011 | Pantos et al. | |
| 2013/0176244 A1 * | 7/2013 | Yamamoto | H04N 21/41407 |
| | | | 345/173 |
| 2013/0179925 A1 * | 7/2013 | Woods | H04N 21/4222 |
| | | | 725/51 |
| 2013/0198787 A1 * | 8/2013 | Perry, II | H04N 7/17345 |
| | | | 725/86 |
| 2014/0282751 A1 * | 9/2014 | Lee | H04N 21/4622 |
| | | | 725/80 |
| 2015/0195619 A1 * | 7/2015 | Choi | H04N 21/8173 |
| | | | 725/40 |
| 2015/0339026 A1 * | 11/2015 | Phang | H04N 21/4263 |
| | | | 348/552 |
| 2016/0234545 A1 * | 8/2016 | Tokikura | H04N 21/4821 |
| 2016/0316247 A1 * | 10/2016 | Biagini | H04H 60/14 |
| 2016/0353176 A1 * | 12/2016 | Leigh | H04N 21/4126 |
| 2016/0378308 A1 * | 12/2016 | Blohowiak | H04N 21/42209 |
| | | | 715/745 |
| 2017/0195736 A1 * | 7/2017 | Chai | H04N 21/4821 |

* cited by examiner

LOCALLY RELAYED BROADCAST AND COMMUNITY SERVICE TELEVISION

CROSS-REFERENCE TO RELATED APPLICATIONS

This application is a divisional application of, and claims priority to, U.S. patent application Ser. No. 15/829,804, for "Locally Relayed Broadcast and Community Service Television," to Didja, Inc., filed on Dec. 1, 2017, which claims the benefit under 35 U.S.C. § 119(e) of the filing date of U.S. Patent Application No. 62/429,673, for "Locally Relayed Broadcast and Community Service Television," which was filed on Dec. 2, 2016, and which are incorporated here by reference.

BACKGROUND

This specification relates to providing local broadcast television to local subscribers through non-broadcast data transmission channels.

Broadcast television is television that is broadcast to television receivers over the air ("OTA programming") and received by antennas coupled to the television receivers. Unless a viewer uses a video recorder, e.g., a digital video recorder ("DVR"), the viewer of broadcast television is limited to viewing programs as they are broadcast, and is further limited to broadcast stations that the viewer's over-the-air antenna can receive at the viewer's geographic location.

In the United States, under Congressional legislation, a satellite television company can provide local broadcast television signals to subscribers, subject to certain limitations.

A satellite company can provide local broadcast television signals to subscribers who reside in the local television station's market; this is commonly referred to as "local-into-local" service. A satellite company has the option of providing local-into-local service, but is not required to do so. "Local-into-local" means the stations located within a particular "designated market area" (DMA) are retransmitted by satellite to subscribers in that same DMA. DMAs are defined by county, and if a viewer is in a county included in a particular DMA, the satellite company can offer the viewer the stations located in the same DMA as part of the local-into-local service of the viewer. DMAs are determined by the Nielsen Company and are based primarily on its measurement of local viewing patterns. This "local into local" capability also applies to Cable TV providers and TV services that operate over telephone networks. Such non-broadcast services can only be provided to subscribers who are located/reside in the particular DMA. Thus broadcast channels are primarily distributed to local subscribers by one of four main means; broadcast-OTA, cable, satellite, or phone network.

SUMMARY

This specification describes technologies that implement services that provide broadcast television channels to subscribers in the manner of local-to-local services directly through data network channels, e.g., to smartphone-based or web-based personal computer applications or applications running on set-top-boxes such as AppleTV, Roku or Smart-TVs. This is a new emerging fifth way to send Broadcast channels to subscribers usually referred to as via "the Internet" or "OTT" ("Over The Top") or "streaming". This specification also describes the technologies that manage the provision of television programming, as well as technologies implemented for applications on smartphones and other devices to interact with the services.

This specification will describe a streaming broadcast television (SBTV) system that provides local broadcast television channels in a DMA over smartphone and web-based applications linked to a streaming Internet service. The SBTV system is used by subscribers and users through an SBTV client, which will be referred to as a "client" for brevity, that includes a video player. Implementations of the client exist for a variety of user devices.

The system acquires the live local broadcast channels, both the main channels, e.g., 7.1, and the sub-channels, e.g., 7.2 and 7.3, over one or more antennas located in the DMA. The signals of the channels are buffered, transcoded, and then sent at the appropriate resolution and bandwidth video profile to the accessing user device of each authenticated subscriber who is tuned to the channel and is located in the specific DMA. The appropriate resolution and bandwidth are determined by the resolution of the source data, the bandwidth of the transmission channel from the source to the user device, and the resolution of the display screen on the user device. A subscriber can watch a television channel on any appropriate computing device, including a home television connected to a casting device or an Internet-ready television.

The service offered by the system includes a fully functional program guide in the client and the ability to record programs for later viewing or building a personal library of content. The service can also be used by a subscriber to view home broadcast channels when traveling away from home, i.e., the system can provide "place-shifting" as long as the subscriber normally resides in the specific DMA. Optionally, if appropriate content owner approvals are obtained, such local content could offered to subscribers outside the specific DMA.

One novel aspect of the design of the system is how the system uses the HLS (HTTP Live Streaming) video streaming protocol. This protocol supports three types of playlists: "live" playlists, which are intended for live broadcasts, "VOD" playlists, which are intended for video on demand, and "event" playlists, which are intended for special cases such as a live stream with a set beginning and a set end. The system uses HLS event media playlists in a novel way to create a virtual event of multiple programs which may start or end in the middle of a program. This allows the service to:

a. provide a quick and smooth transition as a channel being watched moves from one program to the next; and b. allow a subscriber to pause, rewind and fast-forward an active channel, a feature sometimes called "trick-play;" in other words, to seek backwards and then forwards in a live albeit buffered stream. This allows the system either to act like a normal home DVR, e.g., a TiVo® DVR, or to let program owners allow special features like "look back," allowing subscribers to start a live TV show from the beginning even if they turned on the system in the middle of the program.

Another novel aspect of the design of the system is the non-standard program guide the system offers. The design of the guide makes it easy for a subscriber to navigate through a lot of information on a small screen and allows the system to show the information properly on a small screen. One particularly effective technique is the use of diagonal scrolling. Other techniques include how the guide interacts with the live viewing, subject to subscriber usage behavior. The system can provide a guide that includes all the channels in the broadcast DMA even though only a subset of them may be viewable on the client through the service.

The system can make fewer than all possible channels available, i.e., viewable, to its subscribers. This can happen for a number of reasons; for example, some stations may want all of their programs to be listed in the program guide but not want to have all of their programs to be viewable through the system. Non-viewable programs are referred to as 'blackouts". In such cases, the guide can optionally indicate which programs are viewable through the system and which ones are not. In some cases when a program is not viewable it will appear in the viewing window with a notification such as "this program is currently not available". In other cases the whole channel and all its programs may appear in the guide but the channels never appears in the viewing window. The guide can also be configured by the user to show only a subset of the available channels. This full guide feature makes the guide useful for anyone watching TV in the DMA even when watching TV on a different system, e.g., cable TV, or an antenna.

Another novel aspect of the design of the system is the user interface techniques it provides for fast channel changes, for example, swiping left or right for video channels or channel and program headers or jumping from the guide to a program. The system also exploits the design of its local network architecture to route video streams to insure a shortest path for a stream from a system data center to a local household. These novel techniques strive to have the fastest channel changing possible to maximize the ease of browsing and discovering TV programs.

Another novel aspect of the design of the system is the combination of features offered by the system DVR. The system DVR has three modes: (i) trick-play; (ii) temporary, for programs selected by the subscriber, or with automatically suggested programs referred to the subscriber by the content owners or the system, based on subscriber preferences or actions, or based on other conditions, and (iii) permanent personal library. Only programs specifically selected by the subscriber may be stored in and made available in the permanent library of the subscriber.

Another novel aspect of the design of the system is the available user configuration settings and toggles. The design allows viewers to customize aspects of their experience, e.g., channel lists. The design also allows viewers to determine whether to pause automatically or not, whether to keep audio on or not or whether to use the system DVR or not, for example, when certain things occur, for example, an incoming e-mail or phone call when the viewer is watching a program on a smartphone. The design also allows viewers to determine how the service behaves when a viewer switches between a DVR program and a live program, and how the guide behaves. For example, some subscribers may have the system automatically pause a DVR program when the user switches channels away from it, while others may have the DVR program play on.

Another novel aspect of the design of the system is support for universal casting so that all computers or smartphone apps have one way to cast to a connected television regardless which casting product, e.g., Chromecast, Apple TV, Amazon Fire TV, or Roku, is connected to the television. An example would be using one subscriber selected button for all supported devices instead of one button for each casting device, or automatic casting device selection based on subscriber criteria or usage patterns.

The service and system described in this specification can be implemented in particular embodiments so as to realize one or more of the following advantages. The service can provide subscribers very fast channel changing by using a locally based data communication service for the live broadcasts. In the same way, the system can provide subscribers very fast last channel back and forth, including very fast switching between a live channel and a recorded program. The service can present television programs with a low latency, i.e., with a short delay compared to when the subscriber would see the program using an antenna. In some implementations, the latency is less than one minute. The system user interface also features a "Last" button so a user can easily switch between one live channel and another or between a DVR program and a live channel. The service can provide fast channel guide performance that is in sync with what the subscriber is viewing. As a result, the service is effective as a television browsing tool that allows the subscriber to see quickly and visually what is currently being broadcast as an alternative to looking at a guide or searching for a specific program, as is more common on streaming services.

The system also provides a local community and business platform. Advantageously, the system is implemented on a DMA by DMA basis, with a data center covering exactly one DMA, so that, besides being able to carry all local channels, the system is able to carry targeted local community advertising and links to local services and businesses. The system is novel in that it combines the unique set of local channels with unique community events and services, providing a truly different experience that ties local television to local communications. The system thus provides a local (DMA) TV experience, not a national TV experience. Additionally, because the system obtains its signals over the air, the system can handle community communications such as emergency broadcasts and community channels. The system allows local broadcasters to add niche 'digital' channels through the service for programs like local school sports, parades, community gatherings, and so on. Such digital channels would not be available over the air and could be essentially permanent (24×7) or only transitory when they are 'live'.

The system also provides links in the program guide areas and other areas for the subscriber to use to get to other websites or applications so that the system is a hub for subscribers to directly interact with program and broadcast station owners or community partners. For example, the program guide can include with program details about Program-A, which is licensed or owned by Company-B, (i) a link to a page on Company-B's website where the subscriber can see past episodes of Program-A or (ii) a link to a third-party site, e.g., the Google Play™ store, where the subscriber can rent past episodes of Program-A or even (iii) links to download an app from Company-B for more information or programs from Company-B. The system can also help build community by allowing viewers to vote or comment on an issue, or share content with friends and neighbors by sending links. In this respect the system is not a "walled garden" like existing TV viewing applications or services but a hub to enable content providers a simple and easy way to expand their audience or subscribers and discover other programs.

The system provides a password-protected dashboard for broadcasters and other partners to use to provide information to the system, including links for the program guide to include as part of the program information for particular programs or all programs of the broadcaster and other special program information.

The innovative aspects of the subject matter described in this specification can be embodied in methods that include the actions described in this specification. Other embodiments of these aspects include corresponding computer systems, apparatus, and computer programs recorded on one or more computer storage devices, each configured to perform the actions of the methods. For a computer, or a system of one or more computers, to be configured to perform particular operations or actions means that the computer or system has installed on it software, firmware, hardware, e.g., a ASIC or an FPGA, or a combination of them that in operation cause the computer or system to perform the operations or actions. For one or more computer programs to be configured to perform particular operations or actions means that the one or more programs include instructions that, when executed by data processing apparatus, cause the apparatus to perform the operations or actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
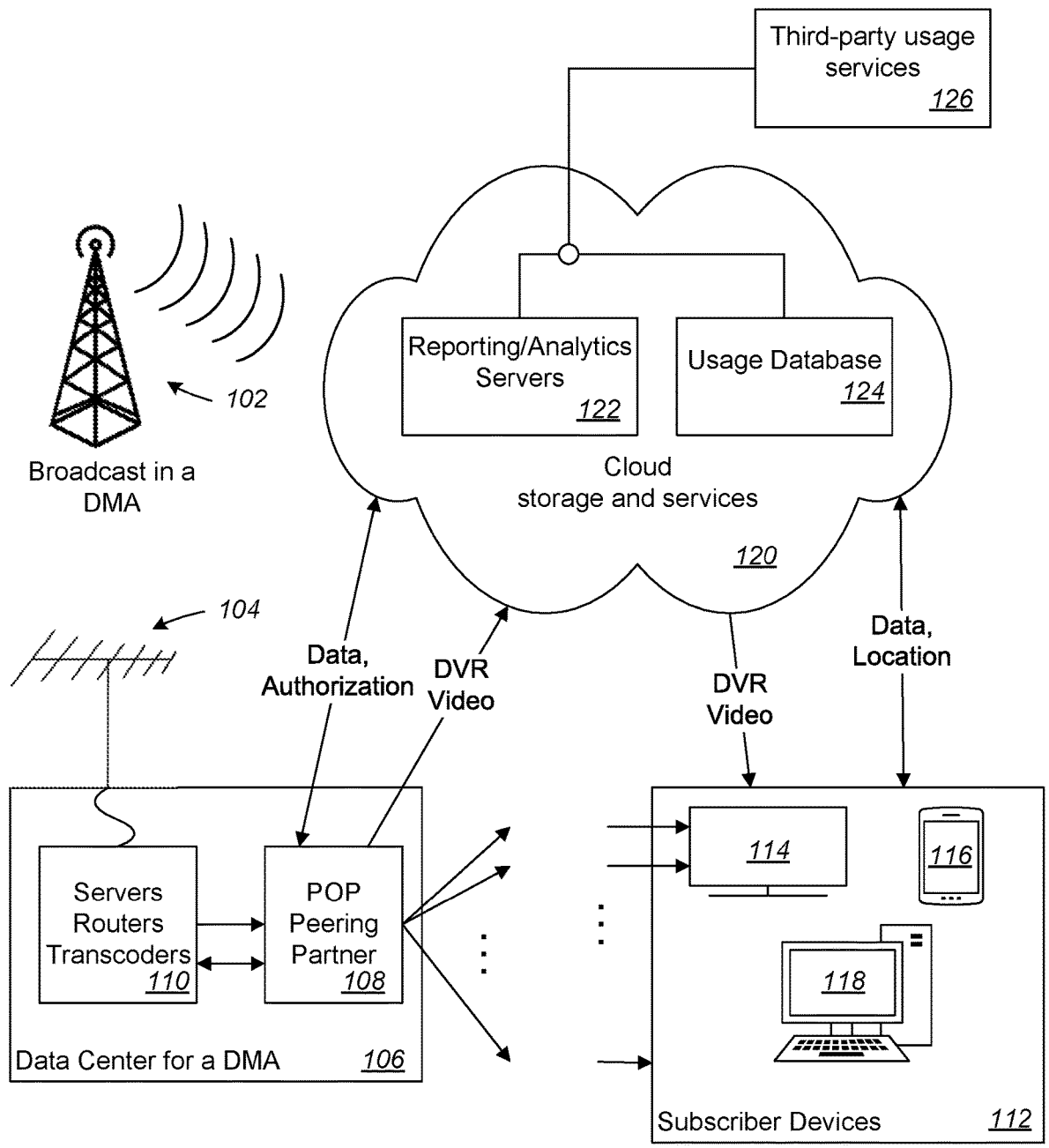
FIGS. 1A and 1B illustrate elements of an example streaming broadcast television system.
Figure 1B:
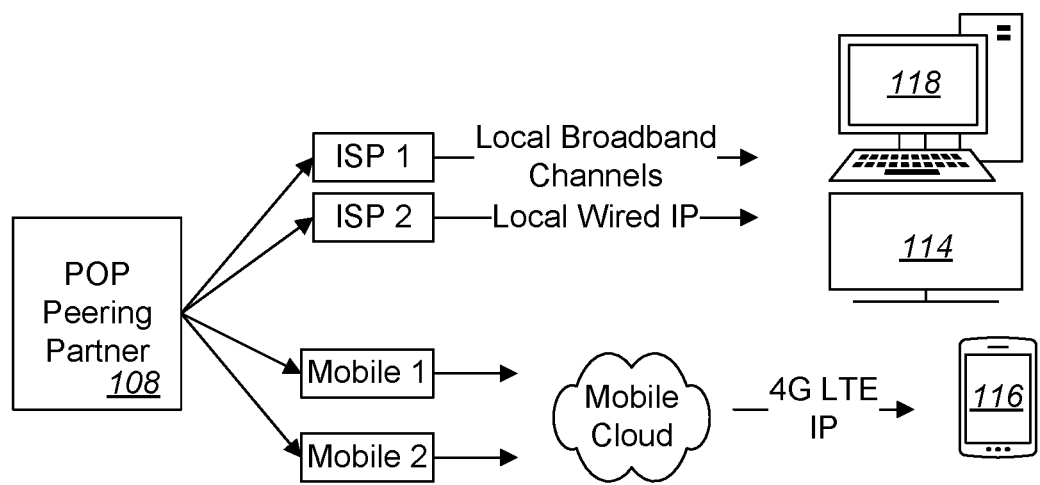

FIGS. 1A and 1B illustrate elements of an example streaming broadcast television (SBTV) system for a particular DMA. The system receives broadcast television signals 102 broadcast within the DMA. The signals are received by one or more antennas 104 located in the DMA. The antenna signals are received in a data center 106 for the DMA, which is advantageously located near a main television transmitter site for the DMA. The data center 106 houses transcoders for the antenna signals as well as servers and routers 110. In some implementations, the data center 106 is a private cloud data center.

The data center includes a point of presence ("POP") 108 for each of one or more network peering partners. The one or more points of presence 108 provide IP data to subscribers' IP-enabled devices, e.g., smart televisions 114 and smartphones 116 and personal computers 116b. Thus, the system can serve its users through one or more ISPs (Internet Service Providers) and mobile carriers and can also check if a subscriber's IP address is a location within the DMA.

In addition to the resources maintained in the data center, the system maintains authentication services, data, and DVR storage in a cloud computing platform 120, e.g., Amazon Web Services ("AWS"), Microsoft Azure, or Google Cloud Platform. The system interacts with the cloud services to exchange data for authentication and authorization, and provides DVR video for storage on the cloud and delivery to subscriber devices 112. Included in the information received from subscriber devices is location information, which the system uses to determine whether the devices are within the DMA of the system and therefore permitted to receive television programming. In some implementations, the cloud computing platform 120 has many server instances running proprietary software of the system as well as third-party software.

The system includes servers, which may be deployed in the cloud computing platform 120, configured to collect and report usage information. These may include one or more reporting and analytics servers 122 and a usage database 124. The usage information can come from a number of sources, including, but not limited to, log files from media servers, log files from a content delivery network, log files from web servers, and data collected from subscriber devices by third-party usage services provided, for example, by third-party providers of user analytics solutions 126, e.g., Facebook, Mixpanel, or Nielsen. The usage and analytics information can either be retrieved from all sources and stored by the system, e.g., in a database 124 or data warehouse, or a summary of such data for the user can be stored. The data is used to produce reports showing how the system is used and can be combined from the different sources and can also be used for more targeted or programmatic advertising to the users.

Figure 2:
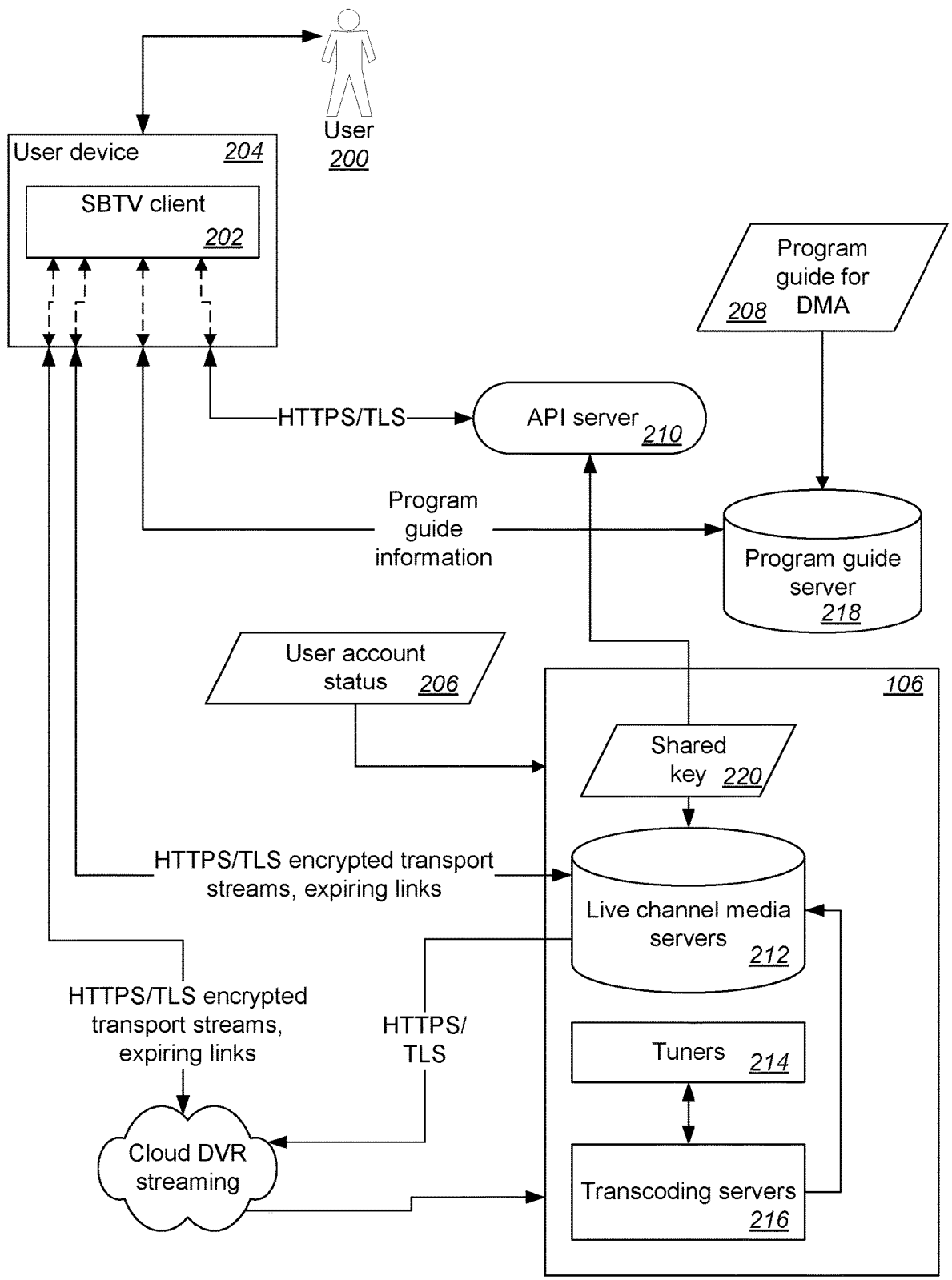
FIG. 2 illustrates elements of such a system and certain data flows between users and system resources.

FIG. 2 illustrates elements of a streaming broadcast television (SBTV) system and certain data flows between users and system resources.

A user 200 interacts with the system through an SBTV client 202 running on a user device 204. The user device may be, for example, a personal computing device, e.g., a smartphone, or an IP-connected television. Generally, depending on the device, the personal computing device will have installed on it a user-device-appropriate version of the SBTV client that provides a convenient user interface for the user to use in interacting with the system, and that also provides functionality for the convenient display and management of television programs and program guides, and for the use of a cloud-based DVR provided by the system for the user.

Since different peering partners will generally have different latencies for delivering content from the data center to the devices of subscribing users, the system will select, for each user device, a peering partner whose POP in the data center provides the best time of delivery to the user.

To use the system, the user must be signed up as an authorized user who is receiving programming within the DMA. The data center 106 receives user account status information 206, e.g., from a business management system, including confirmation that the user is authorized to receive local programming from the system in the DMA. In some implementations, the business management system is implemented on one or more servers on the cloud computing platform 120. The data center also receives program guide information 208 about programs broadcast in the DMA. This information can be obtained under license from an outside service, e.g., Rovi Corporation of San Carlos, Calif., for example. The program guide information is stored in a program guide server 218, which optionally may be software implemented as part of the API server 210 or the media servers 212 described below, or distinct from them. In some implementations, the program guide server 218 and the API server 210 are implemented as one or more servers on the cloud computing platform 120.

The program guide information is used by the system to determine at what times programs begin and end on each channel. The program guide information is also served to the client 202 for presentation to users, as described later in this specification. The program guide information may also be edited, changed or updated by either a login-protected, human operated, program guide dashboard operated by the company or a content or station partner, or automatically via real time guide information updates communicated between the system and third-party systems.

The data center communicates with the user device through an API (application programming interface) server 210 using secure protocols, e.g., HTTPS (HTTP over TLS, HyperText Transport Protocol over Transport Layer Security protocol). TLS encrypts the entire IP packet including the contents, e.g., the encoded digital video data. The system can optionally also encrypt, e.g., using AES-128, the digital video data, but this is unnecessary as long as TLS alone is sufficiently secure for the transmission of the program information and the system and system's client-side software components do not allow local storage by the subscriber of the content. Avoiding the separate encryption of the video data allows the client to change channels very quickly, in minimal time, in some cases in less than one second, which is a very desirable feature for users.

The API server 210 may be located in the data center 106 as illustrated, or it may be implemented in the cloud computing platform 120.

The data center also includes live channel media servers 212 that stream encrypted programs to user devices, which the user devices request using signed URL links. These links expire, i.e., they are valid for only a limited period of time, which is configurable by the system operator.

More specifically, the system uses "signed URL" links that expire after a configurable amount of time to communicate the playlists to the clients on the user devices 204. Inside the data center 106 and the cloud computing platform 120, the media servers 212 and the API server 210 use a shared secret key 220 to further insure security. This key is updated regularly either by the system or manually by a system operator. The API server 210 uses the shared secret key to compute a signature for the media server Ls it serves to the clients, which the clients then use to access the video from the media servers 212. Each media server 212 computes the signature for the request on its own using the shared secret key, and if the signature provided in the request is different from the URL the media server computes, the request is denied. So the media and API servers use the same secret key to construct the URL signatures and thus confirm the URLs are safe. This makes it very hard for outsiders to guess the right URL.

The URLs expire based on a configurable policy specified in the API server 210. The video URLs the API server provides to the clients refer to a playlist associated with the program currently being viewed. That event media playlist is longer if the client: request is farther into the show after it starts. When a client first gets an event media playlist for a channel, the client will begin playing the stream a few segments from the end of the playlist. The number of segments is determined heuristically to give good performance in starting up the stream and getting the next update of the playlist.

If a viewer switches to a new channel, the client requests and plays a new playlist. If the viewer switches back to the same previous channel, the client will get the same URL but with a longer playlist. If the show previously watched had stopped being shown live, then the client would get new a URL playlist for the next program. As a consequence, the playlists are temporary and cannot be reused or copied. In some implementations, the system allows the user to determine by configurable setting whether or not, on switching between channels, the channel being left is paused so that on return, e.g., by selection of a "Last" button, that previous channel will continue playing where the user left off.

In some implementations, the URL has an expiration time that is a few hours after the show is over. This allows the user to pause for periods of time, and then come back and successfully resume playback. It also allows the user to watch uninterrupted TV across multiple TV shows before playback is interrupted. Having an expiring URI, that encompasses more than one program with an expiration time also helps the system determine if the subscriber is still watching a channel. At the expiration time, the client ends the playback and asks the user whether the user is watching and if the user does not respond "yes," the stream stops. This reduces the amount of bandwidth and cost wasted sending video data that is not being viewed.

Programs, in particular, stored programs, can be streamed to the user device, and the interaction with the user device can be managed, by cloud resources, e.g., cloud storage and services resources provided by the cloud computing platform 120 (FIG. 1A).

Figure 3A:
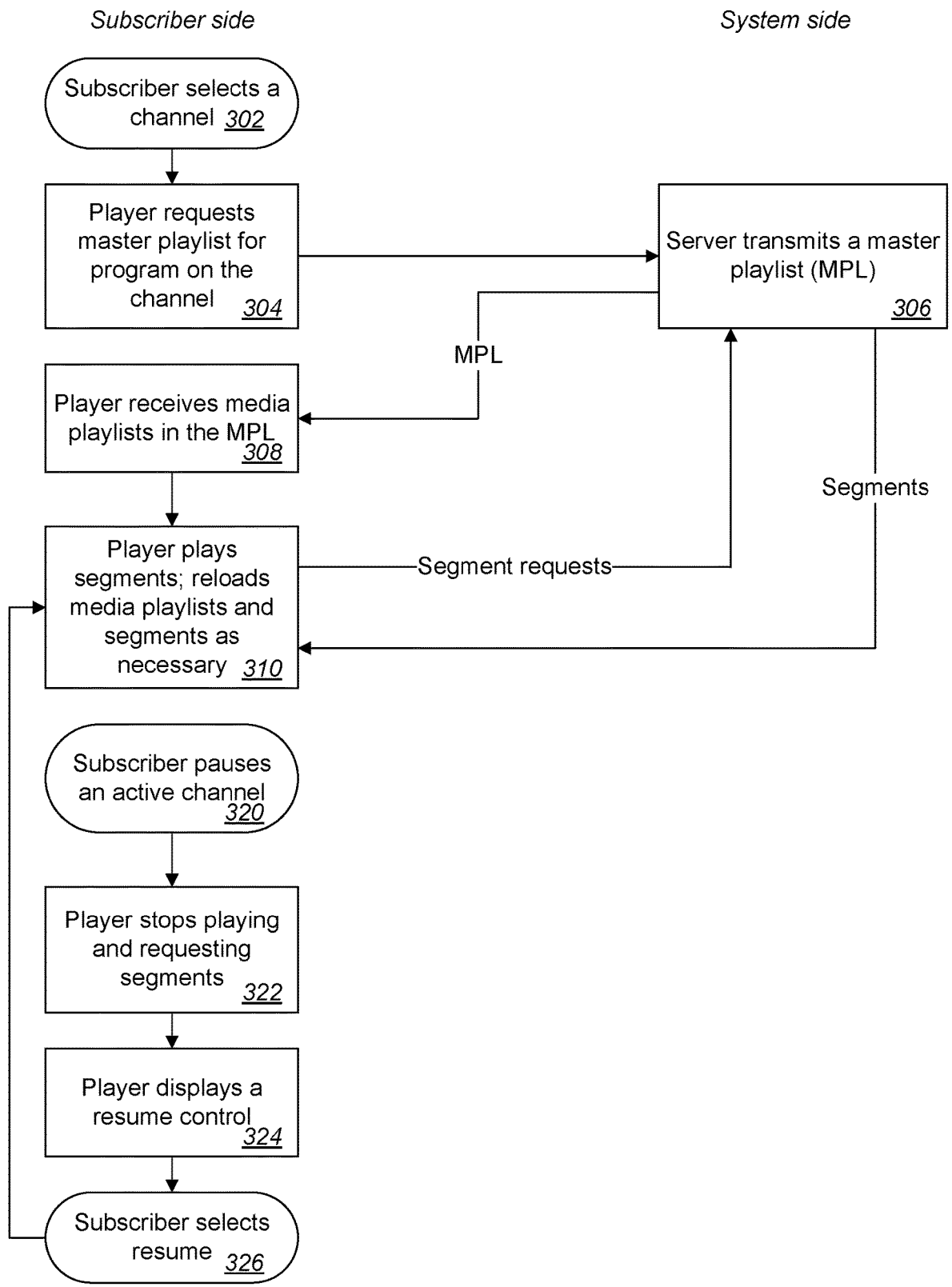
FIG. 3A illustrates an overview of the interactions between a user device and the system when the user selects a channel to watch.

FIG. 3A illustrates an overview of the interactions between a user device and the system when the user selects a channel to watch. When the subscriber selects 302 a channel on the client on the user device, the client's player requests 304 from the system a master playlist ("MPL") for the program currently being broadcast on the channel. Generally, the player is video player software already installed on the user device; however, in some cases the system modifies the player or adds functions that ensure fast efficient operation for features such as handling seeking, for particular clients or user devices. Preferably, but not necessarily, the player is an HLS player, as in the interactions that are described in this specification. The system, generally a live channel media server 212 (FIG. 2) of the system, transmits 306 the MPL, which is an HLS (HTTP Live Streaming) protocol playlist, to the player software. The MPL identifies media playlists that each include an ordered sequence of URLs (Uniform Resource Locators) for the media segments of the program on the channel. Advantageously, the media playlists are event media playlists. Each of the media playlists provides a different variant of the program; the principal difference between the variants is generally the video resolution and bandwidth required. The player obtains the media playlists. Having the media playlists 308, the player requests the segments of the program and plays them on the user device. When the media playlist runs out of segments, the player reloads the playlist, which causes the system to provide an updated playlist 310, which will have a later sequence of segments, and plays them 310. The initial choice of playlist is made to ensure that video begins playing as quickly as possible, and in some implementations this is the lowest bandwidth playlist. Once the video has begun playing, the player measures what bandwidth is actually available while playing a stream. If the bandwidth can support a higher-quality variant playlist, the player will start requesting segments from the higher-quality playlist. At any time, if the current bandwidth is not keeping up with the current stream, the player switches to the segments of a lower-video profile, i.e. lower resolution and lower bandwidth variant playlist, if available.

The transcoders of the system are programmed to produce segments of a heuristically determined optimal length to support fast channel changing and other desirable performance features. The length may be less than ten seconds, e.g., five or six seconds.

When the subscriber pauses 320 an active channel, the player stops playing and requesting 322 segments and displays 324 a resume control that the subscriber can select to resume viewing the channel. When the subscriber does so 326, the player resumes requesting MPLs and media segments as described above, continuing with the segment where the player left off. The player may have to request a new playlist if the URLs of the playlist the player was using have expired.

The HLS protocol and file formats are described in an IETF (Internet Engineering Task Force) Internet-Draft at http://tools.ietf.org/html/draft-pantos-http-live-streaming. Further information about HLS can be found in a number of documents from Apple Inc., including HTTP Live Streaming Overview, https://developer.apple.com/library/content/documentation/NetworkingInternet/Conceptual/StreamingMediaGuide/Introduction/-Introduction.html, Technical Note TN2288 Example Playlist Files, https://developer.apple.com/library/content/technotes/tn2288/index.html, and About HTTP Live Streaming, https://developer.apple.com/library/content/referencelibrary/GettingStarted/-AboutHTTPLiveStreaming/about/about.html. The disclosures of each of the documents cited in this paragraph are incorporated by reference for their descriptions of the technical features of HLS.

HLS supports a number of different types of playlists. The live playlist is intended for and documented as being suitable for continuous broadcasts. In a live playlist, media segment URLs are removed from the beginning of the playlist and added to the end of the playlist as the playlist is updated, so that sequential instances of the playlist provide a sliding window view of the broadcast.

An event media playlist, on the other hand, is updated by adding segment URLs to the end of the playlist as the playlist is updated, without removing any URLs from the beginning. Thus, the playlist grows as the program is broadcast, and the playlist includes segments for the entire broadcast up to the time the playlist was last updated.

As illustrated in FIG. 2, the local broadcasts received by the data center 106 are processed by one or more tuners 214 and transcoders 216 to generate media segments and event media playlists for each of the programs being broadcast on each of the channels in the DMA. The event media playlists are listed in a MPL for the program. As the program is broadcast, the event media playlists are updated by adding the URLs of new media segments of the program to the ends of the playlists. Each of the media playlists represents a different version of the same content. The versions may differ, for example, in bit rate, video format, resolution, or language.

The system determines the times a program is scheduled to begin and end from the program guide information 208 obtained by the system and stored in a program guide server 218. The event media playlists generated for a program begin at a time earlier that the scheduled beginning and end at a time later than the scheduled ending. This allows subscribers to seek back to the beginning of the program, even if they started watching in the middle, and even to the end of the preceding program. The playlists are updated until the determined end time for the playlist, at which point the last segment URL is followed by a tag indicating that the playlist is completed. The playlist thus becomes a video on demand (VOD) playlist. This enables subscribers to pause a program for a long period of time, essentially unlimited, a feature not available on conventional systems. In general, the system can limit how far back a subscriber can go in accordance with generally accepted subscriber DVR fair use rights or the desires of program owners. Such functionality can also be different for a channel that is currently on/viewed or last on/viewed versus what happens if the subscriber changes to a new channel.

The amount of time added to the beginning and end of the scheduled time of a program is determined by the system, for example, according to the scheduled duration of the program or other considerations.

Figure 3B:
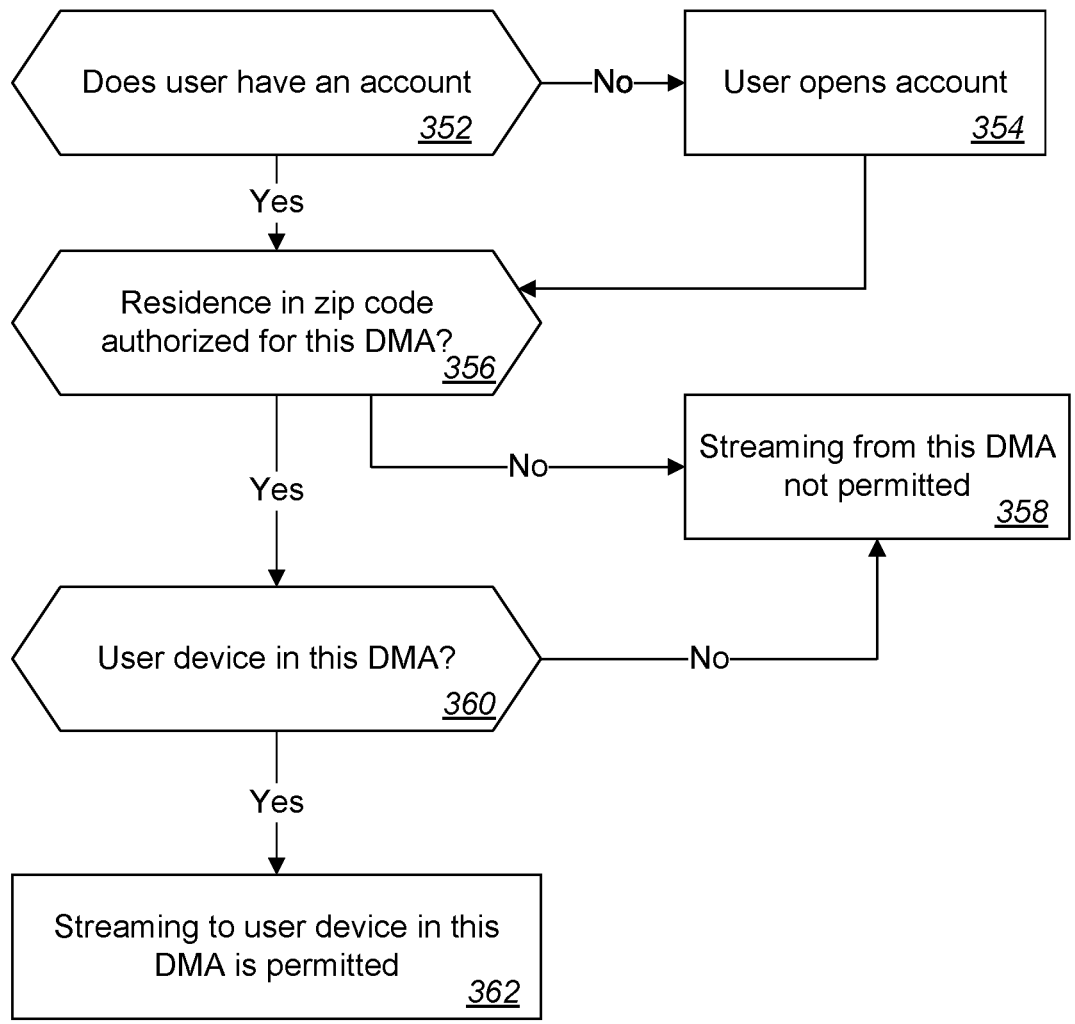
FIG. 3B illustrates an example of collection and use of account information for users.

FIG. 3B illustrates an example of collection and use of account information for users. The system limits the use of the system to subscribers who reside in the DMA of the system and who are in the DMA when they are receiving streaming programming from the system.

The system determines 352 whether the user has an account, and if not, the user opens 354 an account. The system determines 356 whether the user resides in the DMA. The system can determine this from one or more pieces of information, depending on what is available, for example, from the ZIP code of the billing address of the user, from the ZIP code of the mailing address of the user, from a geographic location associated with the IP address of the user device of the user, which the system may obtain from any of a number of geolocation services, or from GPS (Global Positioning System) data obtained from the user device. If the system determines that the user does not reside in this DMA, streaming broadcasts from this DMA to the user is not permitted 358. The system also determines 360 whether the user device is in this DMA. The system can determine this from one or more pieces of information, for example, the IP address of the user device or GPS data received from the user device. If the system determines that the user device is not in this DMA, streaming broadcasts from this DMA to the user device is not permitted 358. Otherwise, it is permitted 362.

The system may optionally also limit how many streams a subscriber account can view simultaneously, as well as limit how many authorized devices a subscriber account can use to view programs. If such limits exist and if the limits are reached or a non-authorized device is being used, then the system will not allow the new user or device to view the programs. Authorized devices can be changed by the subscriber subject to any limits.

Figure 4:
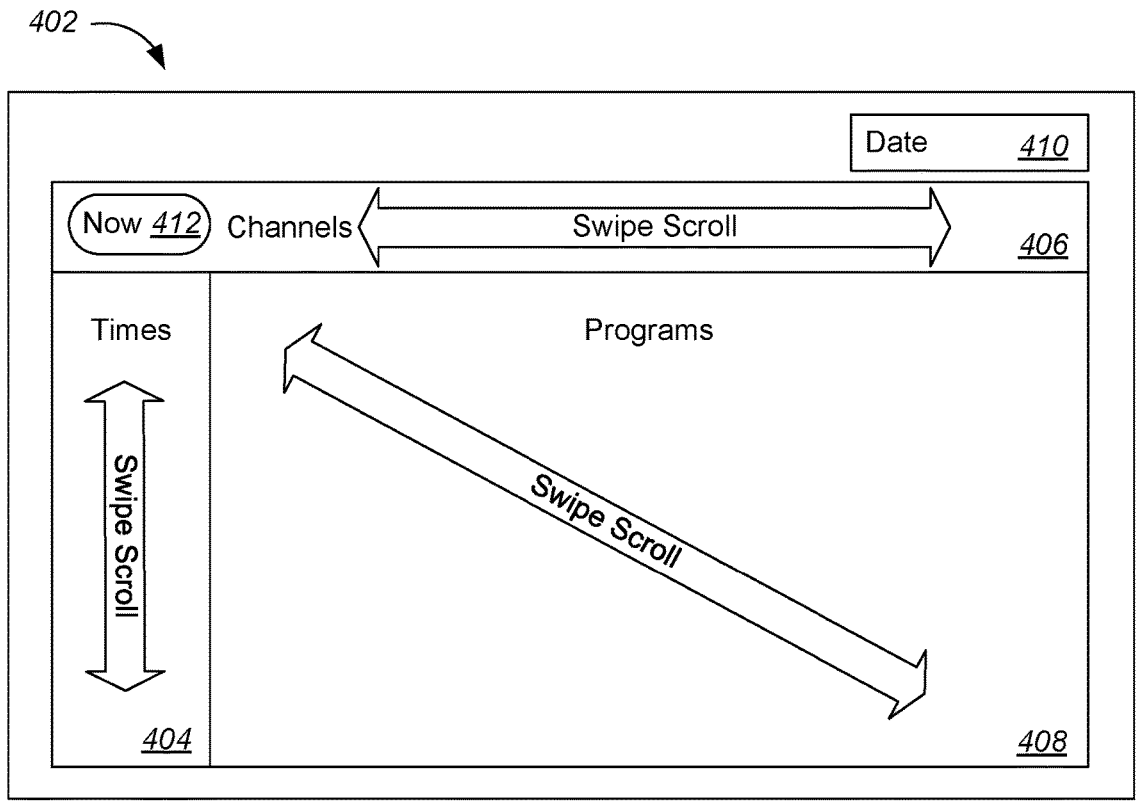
FIG. 4 is a diagram that illustrates schematically an arrangement of an electronic program guide in a user interface.

FIG. 4 is a diagram that illustrates schematically an arrangement of an electronic program guide in a user interface 402 provided by the system to clients on the user devices of its subscribers. The interactive operation of the guide is particularly well suited for use on smartphones and electronic tablets and other devices that have a touch interface. As indicated on the figure, the user can swipe horizontally and vertically to scroll the view of the channels and times on the user interface. Advantageously, the user interface also responds to swipes that are diagonal over the program, to scroll the view simultaneously in both horizontal and vertical directions. In addition, the user can jump ahead by days.

In some implementations, the user interface has a date element 410 that the user can scroll to change the view from day to day, or can select to see a menu of days, e.g., a pull-down menu, from which the user can select. In some implementations, the user interface has a now button 412 or a similar user interface element that the user can select to get the program guide to show the program in context that is currently being played. This can be useful when the user has scrolled to a channel, time, or even date that is distant from the current channel, time, and date. In some implementations, the user interface includes a search interface that a user can use to search for (i) a specific channel, program, series, or episode; (ii) a category, e.g., a genre, actor, or topic; or (iii) a program that is similar to a selected or identified program. The search interface can take as input text typed into the user device, or, optionally, speech.

As shown in the figure, the time axis 404 is vertical horizontal and the channel axis is horizontal 406. However, these can be switched. The program schedule and other information is presented in a conventional grid 408. In addition to the scrolling actions illustrated, the user interface will zoom in to display information about a short program in response to a fat finger input on multiple programs in the grid. Optionally, the client can accept a dual-touch expand gesture as a request to zoom in on a particular part of the displayed guide. If available, the user can use up, down, left, and right buttons, virtual or physical, to navigate the displayed information. As is conventional, a tap selection on a single program will select the program for viewing, if it is being broadcast, or for recording, with options to select recording parameters, if it will be broadcast in the future. Additionally, by zooming into program display information the user can see and select any links to web sites or other applications outside the SBTV client that allow the user to get further program or promotional information or related VOD programs to view.

Optionally, the SBTV client can allow the user to configure the program guide to remove particular user-selected channels from the program guide the user sees or to include only particular user-selected channels.

Figure 5:
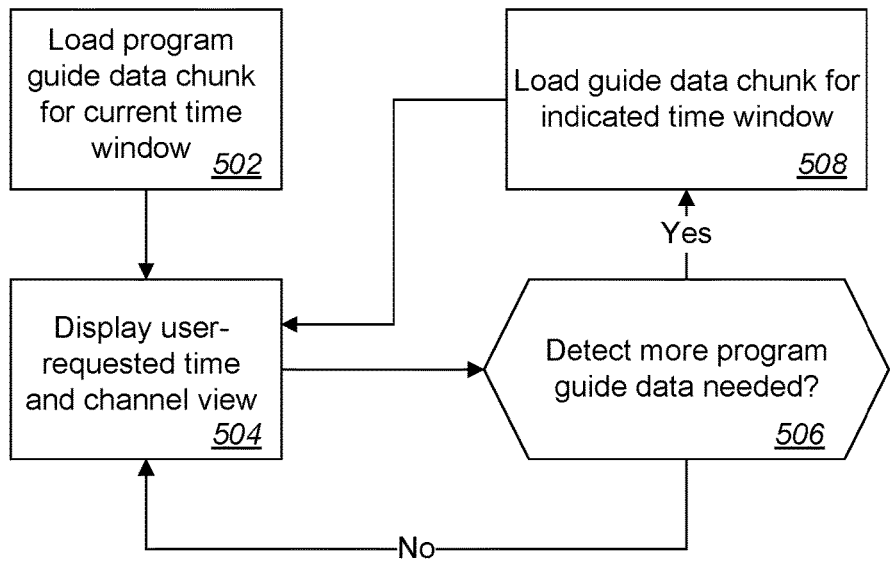
FIG. 5 illustrates interactions between the system and a client on a user device by which the player gets program data.

FIG. 5 illustrates interactions between the system and a client on a user device by which the client gets program data to display to the user. The play requests and loads a chunk of guide data for the current time 502. Preferably the guide data includes listings for all the channels that are available to the user from the system during a time window. The time window begins no later than the current time and it preferably falls on a half-hour boundary. The default time window size can be fixed at eight hours or any other amount of time determined by the system operator. Optionally, the player can request a time window of a different size based, for example, on the amount of memory available on the player for storing program data or on a player-maintained history of user behavior in scrolling to future times, so that the player does not receive data the player is very unlikely to use. Optionally, too, and based on the same considerations, the player can request that some channels not be included in the chunk of data. Such an implementation will enable the fastest response time for displaying subscriber-requested information.

The player displays program data as requested by the user 504, as described in reference to FIG. 4, for example.

When the player detects that it needs or should request more program data 506, it does so 508. The player needs more program data when the user scrolls to a time or channel for which the player has no program data. The player determines that it should request more program data when the user scrolls close to a time or a channel for which the player has no program data, for example. The player can determine whether the user is close based on how fast the user is scrolling. The player recovers memory by discarding data that is no longer needed.

Figure 6A:
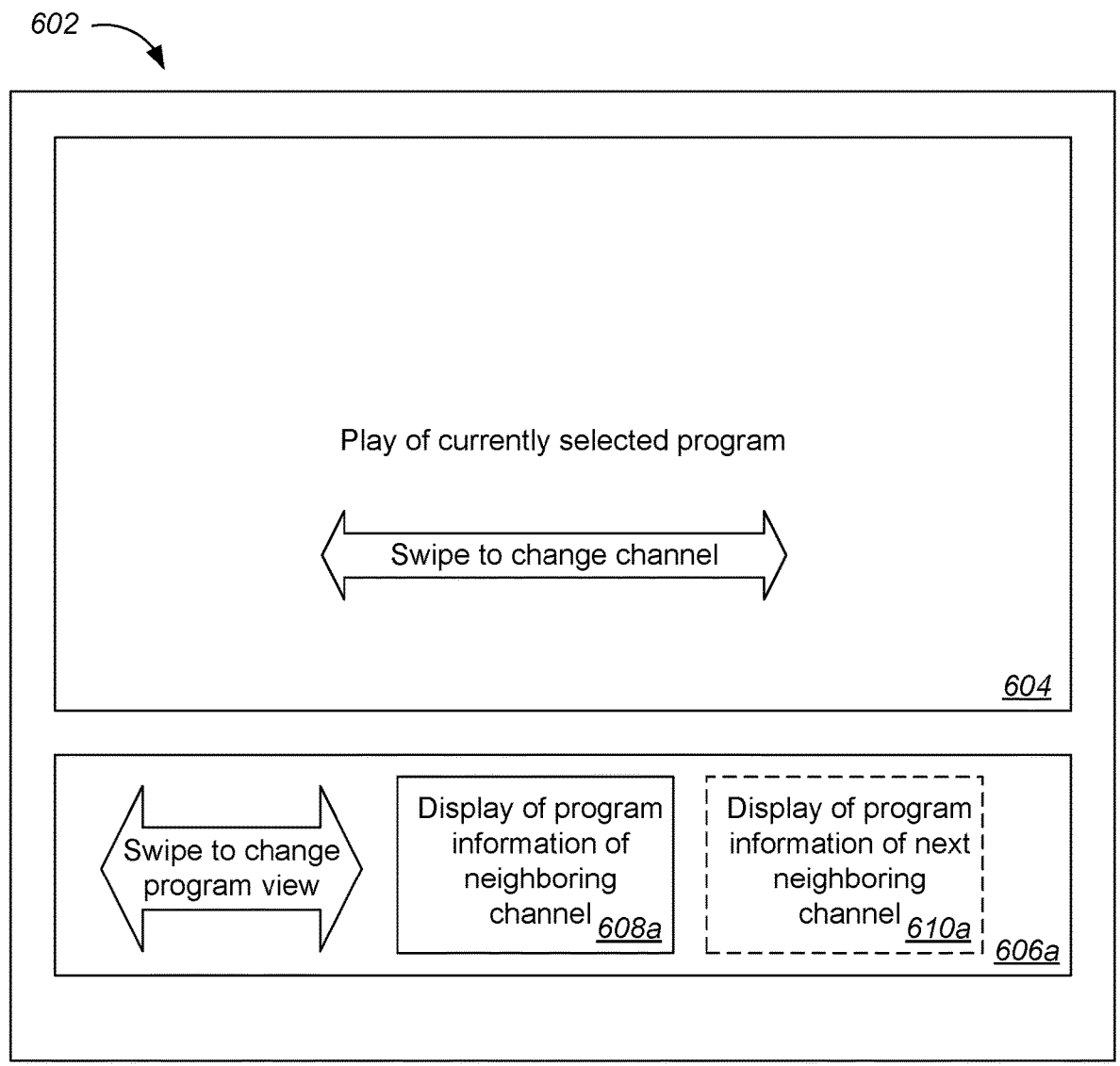
FIGS. 6A and 6B are diagrams that illustrates schematically user interface arrangements showing a program and an example channel changer user interface.

FIG. 6A is a diagram that illustrates schematically one example user interface arrangement showing a program and an example channel changer user interface. In the user interface 602 of the user device, the player plays the currently selected program, i.e., the program on the currently selected channel, in a main program area 604. The player also plays any audio from this program. By swiping left or right or selecting left or right on the main program viewing area 604, the user will change the viewing to the next channels either lower (swipe right) or higher (swipe left). Additionally, just below the viewing window 604 is window 606a which shows channel and program information 608a, 610a for one or more channels so the user can see what is on and zoom in to see any more detailed program information without changing the channel that is being viewed. Similarly, the user can see what program is on a neighboring channel either lower (swipe right) or higher (swipe left) and then select 'watch' to view that channel. This allows for easy and fast browsing and discovery of different programs and fast channel changing in a way that is new to IP-based TV applications. Additionally, the system can optionally provide the capability that with a swipe down on the program area 604, or other user interface action on a virtual or physical user interface element, the user can request that a channel changer 606a be displayed, or, with an opposite action, that it be hidden. Optionally, the client can be configured by the system to always show a channel changer window 606a, or to do so for particular classes of user devices, e.g., smartphones. When the channel changer is first displayed, it shows, by default, information for channels adjacent to the one being viewed in the main program area 604 that are showing different programs. Optionally, the system can allow a user to select a different default starting channel or to show information for other channels that are showing the same program as is being shown in the main program area 604. The user can select any of the channels shown in the channel changer area 606a to change the channel for display in the main program area 604 and then close the channel changer.

Figure 6B:
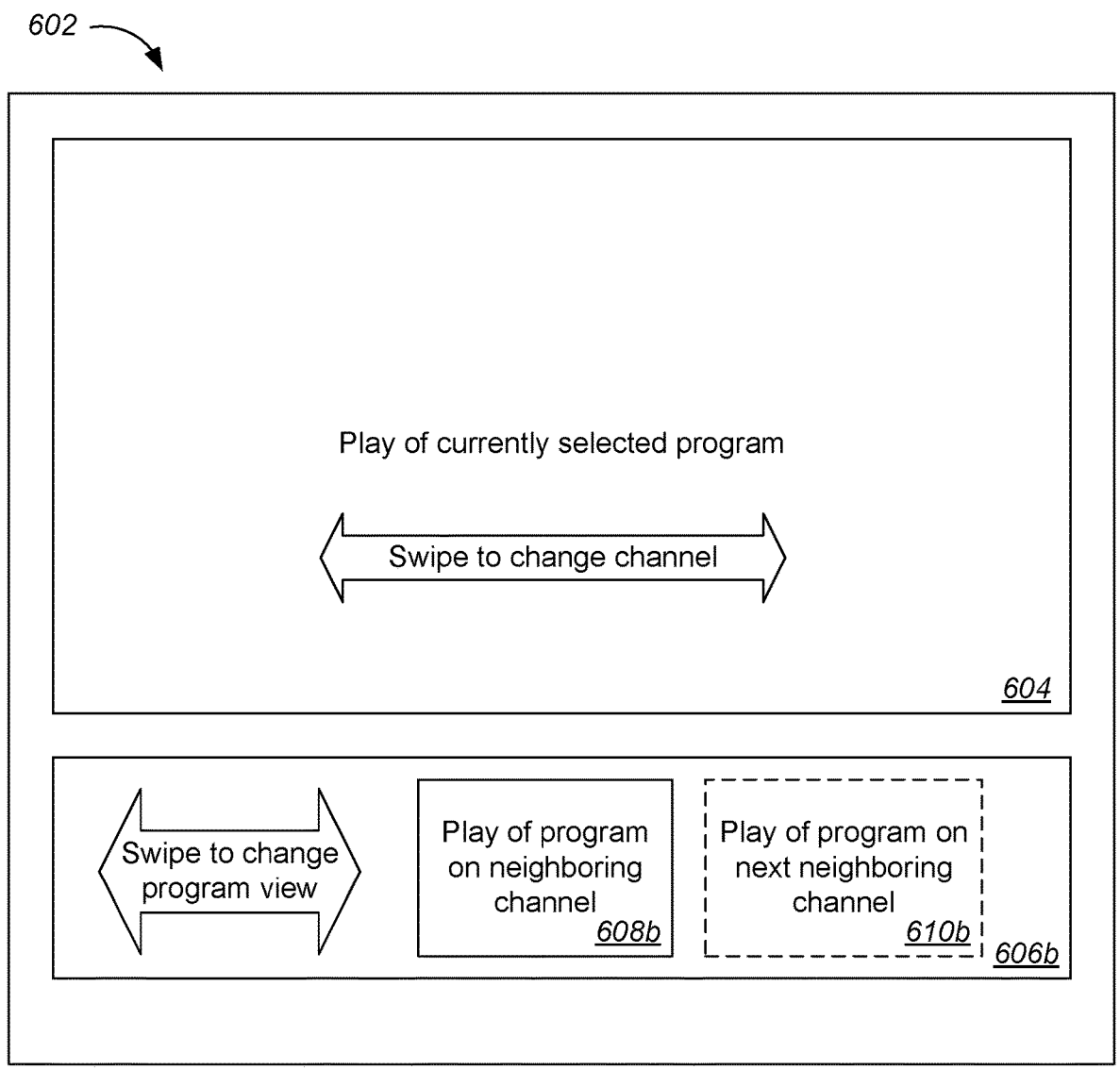

FIG. 6B is a diagram that illustrates schematically a different example user interface arrangement showing a program and an example channel changer user interface. This arrangement differs from that of FIG. 6A in that, in the channel changer area 606b, the player silently plays the current program from a neighboring channel in a small window 608a, which is preferably decorated with or accompanied by channel information and program information of that neighboring channel. Initially, as a system default, the neighboring channel is the one with the next higher channel number in sequence that is broadcasting a program different from the one being played on the main program area 604.

The system may define, or optionally allow the user to define, other default channels. Then, with a swiping motion, or with left and right directional keys, virtual or physical, the user can quickly scan left and right through adjacent channels, seeing their programs played in the small window 608b. Optionally, the player can provide a second small window 610b or even further small windows in the channel changer interface, each silently playing a lower or higher channel according to its relative position. The user can select any of the channels playing in a small window to change the channel for display in the main program area 604 and then close the channel changer.

An advantageous aspect of the user interface arrangements just described in reference to FIGS. 6A and 6B is that they are made primarily for discovery and browsing, in contrast to an arrangement of selection menus and trees of menus, which rely more on search or menu selection than browsing. The system also supports a conventional universal search, but that is expected to be a secondary paradigm for many users. Another advantageous aspect of the user interface is that the client opens by immediately playing the last channel the user watched.

Thus, the system has a structure and user interface purpose built for program discovery and browsing in multiple ways to achieve fast channel changing and view selection without requiring the user to use nests of menus or search functions, providing the system's users a most efficient browsing and discovery experience.

Figure 7:
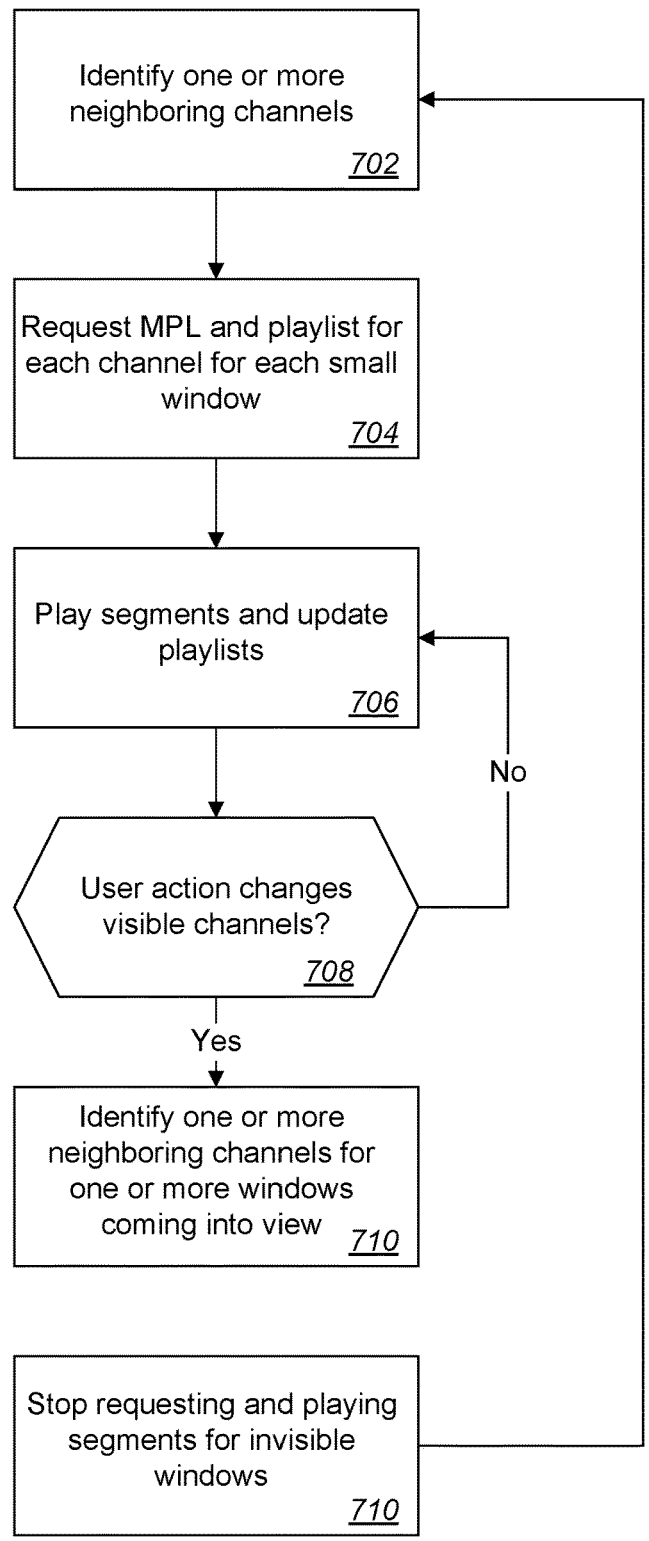
FIG. 7 illustrates interactions between the system and a client with its player by which they play one or more neighboring channels in a channel changer user interface while a main program is playing in a large format.

FIG. 7 illustrates interactions between the system and a client with its player on a user device by which they play one or more neighboring channels in a channel changer user interface or otherwise in a small format while a main program is playing in a large format.

The client identifies one or more neighboring channels 702, i.e., channels that are numerically adjacent to the channel being played in the main program window, as described above, according to the number of small windows to be displayed and the system or user settings for determining which channels qualify as neighboring. As described in reference to FIG. 3, for each small window 606a, 606b, the player requests the MPL for the neighboring channel that will be played in the window and initially requests the lowest resolution media playlist from each MPL. The player plays 706 the segments from the playlists and updates 706 the playlists, as described in reference to FIG. 3, in the respective small windows. When the user scrolls the small windows, e.g., by swiping in the channel changer area, the apparent effect is to slide some visible windows out of view and other new windows into view, i.e., to change the visible channels 710 (Yes). In that case, the player stops 702 requesting and playing segments for the channel in the now invisible windows 712. The client identifies 702 a neighboring channel to play in each newly-visible window, requests 704 an MPL and playlist for each such neighboring channel, and plays 706 the segments of the playlists, as described above.

The same operations will be performed by the client and player in any circumstance in which the client is asked to play a picture-in-picture view of another channel when a channel is being displayed in a main display window.

Figure 8:
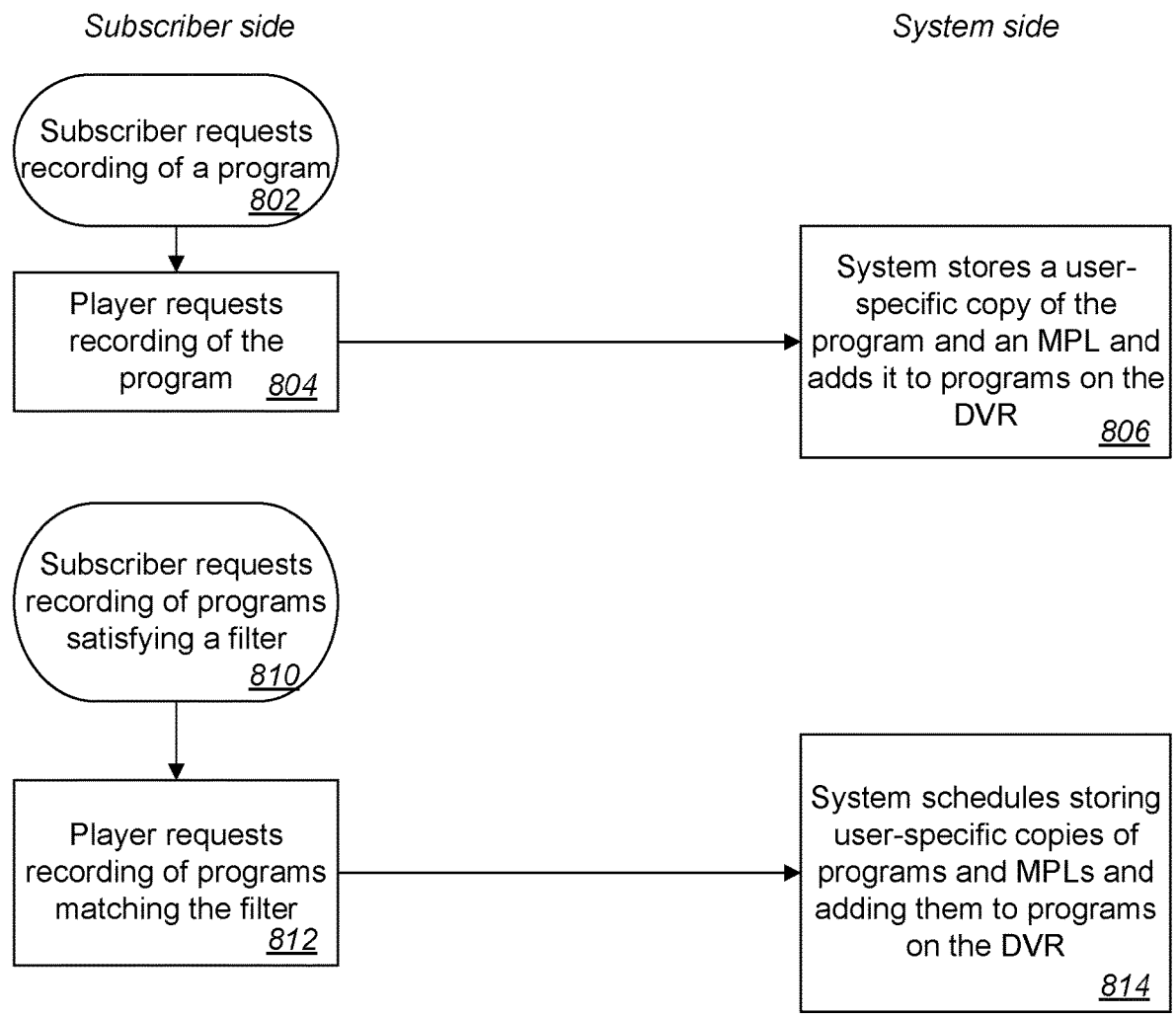
FIG. 8 illustrates operations relating to a DVR provided to each user by the system.

FIG. 8 illustrates operations relating to a DVR provided to each user by the system.

When a user, who is a subscriber, requests 802 that a program be recorded, whether it is a program currently being broadcast or a one to be broadcast in the future, the client sends 804 the request to the system. The system maintains in non-volatile storage, e.g., in the cloud, a DVR for each subscriber that contains copies of programs recorded by the subscriber and that are available for replay only to that subscriber. The system thus responds to the request by storing 806 the requested program in a permanent storage repository, indexed and secured for the subscriber, along with an MPL for the program and the associated individual VOD playlists and associated media files for each resolution/bandwidth profile for the program as applicable. The system can then provide the recorded program to the user device of the subscriber in the future in response to a request that the program be played from the DVR belonging to the subscriber. If the program is to be broadcast in the future, the request is queued and the system stores 806 the program when it is available. Programs are played from the DVR as described above for broadcast programs in reference to FIG. 3A A subscriber can also request 810 that programs of particular kinds on particular channels be recorded on the DVR of the subscriber. The subscriber can do this by defining a filter in a user interface of the client. The filter can identify the programs to be recorded by one or more features, for example: type of content, e.g., all the future episodes of a particular program, football games, Western movies, or European soccer; or particular programs by name or date and time of broadcast. The filter can also limit the recordings to first broadcasts only or not; or to one or more particular channels; or to one or more times of day. The client sends 812 the request to the system. If the request is acceptable, the system establishes a schedule of storing 814 the requested programs as described above for replay by the subscriber through the DVR of the subscriber.

The DVR recording system has two main areas, temporary storage of a configurable duration for each stored item, e.g., 28 days, and a permanent area for a "library," i.e., storage of certain recordings selected by the subscriber. The library permanent storage can have storage limits set in terms of gigabytes or viewing hours, and any individual program can be deleted by the subscriber. Additionally, these recordings are only for the subscriber to view and as such can be offered in different forms when later viewed. Three examples are a) storing with the original commercials intact which, if viewed, could be added to C3 and C7 viewing ratings such as Nielsen; b) modifying the commercials after a certain time period, e.g., 7 days, changing the original commercials with highly targeted ads for the subscribers; and c) modifying the program for certain viewing durations such as watching a 30 minute episode in 10 minutes or a 4 hour soccer match in 1 hour.

Figure 9:
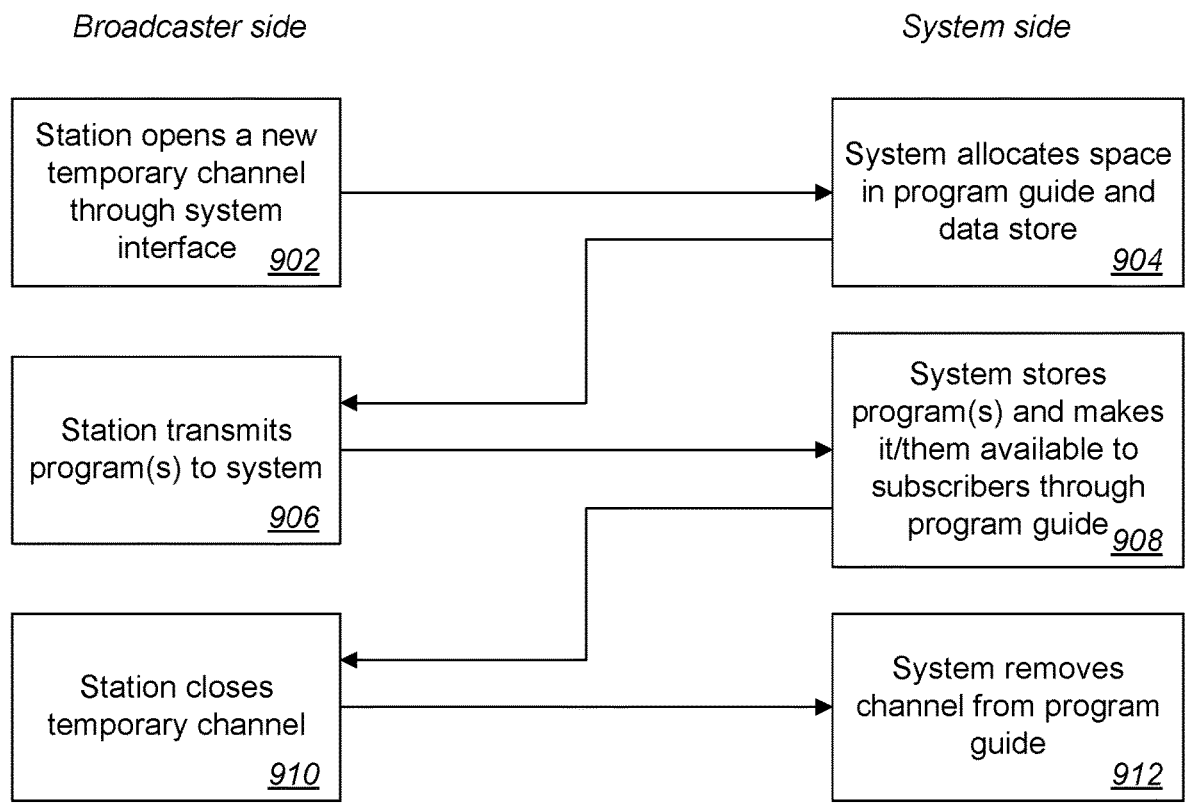
FIG. 9 illustrates an example interaction between a broadcaster providing a new channel and the system.

FIG. 9 illustrates an example interaction between a broadcaster providing a new channel and the system.

Normally, the system gets programs over the air from broadcasters, as described above in reference to FIGS. 1A and 1B. A television station will generally use one major channel number and one or more minor channel numbers for one or more programs. A station using major channel number 5, for example, will typically broadcast its main programming on digital channel 5.1, i.e., minor channel 1, and other programming on other minor channels under channel 5, e.g., channels 5.2, 5.3, and so on.

The system provides an interface for a station to bring up channels on the fly and temporarily for particular purposes. For example, a station may bring up a channel to broadcast a local sporting or civic event. Through the interface, a station requests 902 that the system open a new temporary channel for the station. The system allocates 904 space in the program guide display for the new channel and other resources including an initial allocation of data storage for the new channel. The system shows temporary channels on the program guide, illustrated in FIG. 4, in their channel number order. The program guide information for the temporary channels is received from the station, either with the initial request or later. The station transmits 906 the content of the temporary channel, preferably in a data stream directly from the station and not over the air, in a form that does not need to be transcoded by the system. The system stores 908 the program content, generates an MPL for each program, as necessary, and makes the programs available to subscribers through the program guide. When the programming on the temporary channel is concluded, the station closes 910 the temporary channel and the system removes 912 the channel from the program guide deallocates any data storage allocated for the channel.

Optionally, the system can allow a station to provide its live programs to the data center of the system, directly or through a cloud interface, in a data stream that the data center will use instead of the signal broadcast over the air. Such data streams can be permanent or come and go in the program guide based on whether program content is available or not.

The functional operations described in this specification can be implemented in digital electronic circuitry, in tangibly-embodied computer software or firmware, in computer hardware, including the structures disclosed in this specification and their structural equivalents, or in combinations of one or more of them. The operations described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA (field programmable gate array) or an ASIC (application specific integrated circuit), or by a combination of special purpose logic circuitry and one or more programmed computers.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with administrators, operators, and other users, the servers and other systems of the data center described in this specification can be implemented on computers having a display device for displaying information to the user and a keyboard and a pointing device, e.g., a mouse or a trackball, by which the user can provide input to the computer. Other kinds of devices can be used to provide for interaction with a user as well, e.g., smartphones and electronic tablets, and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A user device comprising:
a touch screen display and one or more computers, the one or more computers configured by installed software to perform operations comprising:
displaying a television program guide in a display area of the touch screen display, a program guide showing program information about programs in a grid of times and channels;
responding to a fat-finger input on one or more grid cells by zooming in on the area of the input; and
responding to a diagonal swiping motion on the touch screen display, wherein the swiping motion crosses two or more times and two or more channels, by changing the display of both times and channels according to the direction of the swiping motion.

2. The user device of claim 1, wherein user device is a smartphone and the software is an app installed on the smartphone.

3. The user device of claim 1, wherein the software is code running in a web browser.

4. The user device of claim 1, wherein the cells in the grid include (i) one or more cells each with a respective indication of whether the program identified in the cell is viewable on the user device, (ii) one or more cells each with a respective indication of whether the program identified in the cell has a special feature, or (iii) one or more cells each with a respective indication of whether the program identified in the cell has a special restriction.

5. The user device of claim 4, wherein each respective indication is any one or more of a color, symbol, or text.

6. The user device of claim 1, wherein the cells in the grid include one or more cells each with an indication that the program identified in the cell is viewable outside a DMA area in which the identified program is broadcast.

7. The user device of claim 6, wherein the indication is any one or more of a color, symbol, or text.

8. The user device of claim 1, wherein the cells in the grid include one or more cells with an indication that the program identified in the cell has a particular parental guideline rating or content descriptor.

9. The user device of claim 1, wherein the cells in the grid include one or more cells each with an indication that the program identified in the cell is in a particular language, has closed captions, or has subtitles.

10. The user device of claim 1, wherein the cells in the grid include one or more cells each with an indication that the program identified in the cell is recommended to a subscriber using the user device by a system providing the program guide.

11. The user device of claim 1, wherein the cells in the grid include one or more cells each with an indication of that the program identified in the cell is restricted to being played only on a particular type of device such as an Internet-connect television.

12. A user device comprising:
a touch screen display and one or more computers, the one or more computers configured by installed software to perform operations comprising:
displaying, in a first display area of the touch screen display, a streamed television program received by a streaming service from a television station on a first television channel;
displaying, in a second display area of the touch screen display, a second display displaying, by default, text information describing the program being displayed in the first display area;
responding to a horizontal swiping motion on the touch screen display in the first display area by changing the display to displaying a different program being received by the service on a neighboring channel according to the direction of the swiping motion;
responding to a swiping motion in the second display area by displaying text information about other programs on television channels neighboring the first television channel without changing what is being displayed in the first display area; and
responding to a user selection, in the second display area, on information about a particular neighboring channel by changing the program displayed in the first display area to the program on the particular neighboring channel.

13. One or more computer-readable storage media encoded with instructions that, when executed by a user device comprising a touch screen display and one or more computers, cause the one or more computers to perform operations comprising:
displaying a television program guide in a display area of the touch screen display, a program guide showing program information about programs in a grid of times and channels;
responding to a fat-finger input on one or more grid cells by zooming in on the area of the input; and
responding to a diagonal swiping motion on the touch screen display, wherein the swiping motion crosses two or more times and two or more channels, by changing the display of both times and channels according to the direction of the swiping motion.

14. The one or more computer-readable storage media of claim 13, wherein the cells in the grid include (i) one or more cells each with a respective indication of whether the program identified in the cell is viewable on the user device, (ii) one or more cells each with a respective indication of whether the program identified in the cell has a special feature, or (iii) one or more cells each with a respective indication of whether the program identified in the cell has a special restriction.

15. The one or more computer-readable storage media of claim 13, wherein the cells in the grid include one or more cells each with an indication that the program identified in the cell is viewable outside a DMA area in which the identified program is broadcast.

16. The one or more computer-readable storage media of claim 15, wherein the indication is any one or more of a color, symbol, or text.

17. The one or more computer-readable storage media of claim 13, wherein the cells in the grid include one or more cells with an indication that the program identified in the cell has a particular parental guideline rating or content descriptor.

18. The one or more computer-readable storage media of claim 13, wherein the cells in the grid include one or more cells each with an indication that the program identified in the cell is in a particular language, has closed captions, or has subtitles.

19. The one or more computer-readable storage media of claim 13, wherein the cells in the grid include one or more cells each with an indication that the program identified in the cell is recommended to a subscriber using the user device by a system providing the program guide.

20. The one or more computer-readable storage media of claim 13, wherein the cells in the grid include one or more cells each with an indication of that the program identified in the cell is restricted to being played only on a particular type of device such as an Internet-connect television.

21. One or more computer-readable storage media encoded with instructions that, when executed by a user device comprising a touch screen display and one or more computers, cause the one or more computers to perform operations comprising:
displaying, in a first display area of the touch screen display, a streamed television program received by a streaming service from a television station on a first television channel;
displaying, in a second display area of the touch screen display, a second display displaying, by default, text information describing the program being displayed in the first display area;
responding to a horizontal swiping motion on the touch screen display in the first display area by changing the display to displaying a different program being received by the service on a neighboring channel according to the direction of the swiping motion;
responding to a swiping motion in the second display area by displaying text information about other programs on television channels neighboring the first television channel without changing what is being displayed in the first display area; and
responding to a user selection, in the second display area, on information about a particular neighboring channel by changing the program displayed in the first display area to the program on the particular neighboring channel.

22. A user device comprising:
a touch screen display and one or more computers, the one or more computers configured by installed software to perform operations comprising:
displaying a television program guide in a display area of the touch screen display, a program guide showing program information about programs in a grid of times and channels; and
responding to a diagonal swiping motion on the touch screen display, wherein the swiping motion crosses two or more times and two or more channels, by changing the display of both times and channels according to the direction of the swiping motion;
wherein the cells in the grid include one or more cells each with an indication that the program identified in the cell is viewable outside a DMA area in which the identified program is broadcast.

23. The user device of claim 22, wherein user device is a smartphone and the software is an app installed on the smartphone.

24. The user device of claim 22, wherein the software is code running in a web browser.

25. The user device of claim 22, wherein the cells in the grid include (i) one or more cells each with a respective indication of whether the program identified in the cell is viewable on the user device, (ii) one or more cells each with a respective indication of whether the program identified in the cell has a special feature, or (iii) one or more cells each with a respective indication of whether the program identified in the cell has a special restriction.

26. The user device of claim 25, wherein each respective indication is any one or more of a color, symbol, or text.

27. The user device of claim 22, wherein the cells in the grid include one or more cells with an indication that the program identified in the cell has a particular parental guideline rating or content descriptor.

28. The user device of claim 22, wherein the cells in the grid include one or more cells each with an indication that the program identified in the cell is in a particular language, has closed captions, or has subtitles.

29. The user device of claim 22, wherein the cells in the grid include one or more cells each with an indication that the program identified in the cell is recommended to a subscriber using the user device by a system providing the program guide.

30. The user device of claim 22, wherein the cells in the grid include one or more cells each with an indication of that the program identified in the cell is restricted to being played only on a particular type of device such as an Internet-connect television.

31. A user device comprising:
a touch screen display and one or more computers, the one or more computers configured by installed software to perform operations comprising:
displaying a television program guide in a display area of the touch screen display, a program guide showing program information about programs in a grid of times and channels; and
responding to a diagonal swiping motion on the touch screen display, wherein the swiping motion crosses two or more times and two or more channels, by changing the display of both times and channels according to the direction of the swiping motion;
wherein the cells in the grid include one or more cells each with an indication of that the program identified in the cell is restricted to being played only on a particular type of device such as an Internet-connect television.

32. The user device of claim 31, wherein user device is a smartphone and the software is an app installed on the smartphone.

33. The user device of claim 31, wherein the software is code running in a web browser.

34. The user device of claim 31, wherein the cells in the grid include (i) one or more cells each with a respective indication of whether the program identified in the cell is viewable on the user device, (ii) one or more cells each with a respective indication of whether the program identified in the cell has a special feature, or (iii) one or more cells each with a respective indication of whether the program identified in the cell has a special restriction.

35. The user device of claim 34, wherein each respective indication is any one or more of a color, symbol, or text.

36. The user device of claim 31, wherein the cells in the grid include one or more cells with an indication that the program identified in the cell has a particular parental guideline rating or content descriptor.

37. The user device of claim 31, wherein the cells in the grid include one or more cells each with an indication that the program identified in the cell is in a particular language, has closed captions, or has subtitles.

38. The user device of claim 31, wherein the cells in the grid include one or more cells each with an indication that the program identified in the cell is recommended to a subscriber using the user device by a system providing the program guide.

39. One or more computer-readable storage media encoded with instructions that, when executed by a user device comprising a touch screen display and one or more computers, cause the one or more computers to perform operations comprising:
displaying a television program guide in a display area of the touch screen display, a program guide showing program information about programs in a grid of times and channels; and
responding to a diagonal swiping motion on the touch screen display, wherein the swiping motion crosses two or more times and two or more channels, by changing the display of both times and channels according to the direction of the swiping motion;
wherein the cells in the grid include one or more cells each with an indication of that the program identified in the cell is restricted to being played only on a particular type of device such as an Internet-connect television.

40. The one or more computer-readable storage media of claim 39, wherein the cells in the grid include (i) one or more cells each with a respective indication of whether the program identified in the cell is viewable on the user device, (ii) one or more cells each with a respective indication of whether the program identified in the cell has a special feature, or (iii) one or more cells each with a respective indication of whether the program identified in the cell has a special restriction.

41. The one or more computer-readable storage media of claim 39, wherein the cells in the grid include one or more cells each with an indication that the program identified in the cell is viewable outside a DMA area in which the identified program is broadcast.

42. The one or more computer-readable storage media of claim 41, wherein the indication is any one or more of a color, symbol, or text.

43. The one or more computer-readable storage media of claim 39, wherein the cells in the grid include one or more cells with an indication that the program identified in the cell has a particular parental guideline rating or content descriptor.

44. The one or more computer-readable storage media of claim 39, wherein the cells in the grid include one or more cells each with an indication that the program identified in the cell is in a particular language, has closed captions, or has subtitles.

45. The one or more computer-readable storage media of claim 39, wherein the cells in the grid include one or more cells each with an indication that the program identified in the cell is recommended to a subscriber using the user device by a system providing the program guide.

46. One or more computer-readable storage media encoded with instructions that, when executed by a user device comprising a touch screen display and one or more computers, cause the one or more computers to perform operations comprising:
displaying a television program guide in a display area of the touch screen display, a program guide showing program information about programs in a grid of times and channels; and
responding to a diagonal swiping motion on the touch screen display, wherein the swiping motion crosses two or more times and two or more channels, by changing the display of both times and channels according to the direction of the swiping motion;
wherein the cells in the grid include one or more cells each with an indication that the program identified in the cell is viewable outside a DMA area in which the identified program is broadcast.

47. The one or more computer-readable storage media of claim 46, wherein the cells in the grid include (i) one or more cells each with a respective indication of whether the program identified in the cell is viewable on the user device, (ii) one or more cells each with a respective indication of whether the program identified in the cell has a special feature, or (iii) one or more cells each with a respective indication of whether the program identified in the cell has a special restriction.

48. The one or more computer-readable storage media of claim 47, wherein each respective indication is any one or more of a color, symbol, or text.

49. The one or more computer-readable storage media of claim 46, wherein the cells in the grid include one or more cells with an indication that the program identified in the cell has a particular parental guideline rating or content descriptor.

50. The one or more computer-readable storage media of claim 46, wherein the cells in the grid include one or more cells each with an indication that the program identified in the cell is in a particular language, has closed captions, or has subtitles.

51. The one or more computer-readable storage media of claim 46, wherein the cells in the grid include one or more cells each with an indication that the program identified in the cell is recommended to a subscriber using the user device by a system providing the program guide.

52. The one or more computer-readable storage media of claim 46, wherein the cells in the grid include one or more cells each with an indication of that the program identified in the cell is restricted to being played only on a particular type of device such as an Internet-connect television.

* * * * *